(12) United States Patent
Clark

(10) Patent No.: US 11,372,109 B1
(45) Date of Patent: Jun. 28, 2022

(54) LIDAR WITH NON-CIRCULAR SPATIAL FILTERING

(71) Applicant: Acuity Technologies, Inc., Menlo Park, CA (US)

(72) Inventor: Reece Robert Clark, Emerald Hills, CA (US)

(73) Assignee: Acuity Technologies, Inc., Menlo Park, CA (US)

( * ) Notice: Subject to any disclaimer, the term of this patent is extended or adjusted under 35 U.S.C. 154(b) by 760 days.

(21) Appl. No.: 16/231,366

(22) Filed: Dec. 21, 2018

Related U.S. Application Data

(60) Provisional application No. 62/708,900, filed on Dec. 26, 2017.

(51) Int. Cl.
| | |
|---|---|
| *G01C 3/08* | (2006.01) |
| *G01S 17/88* | (2006.01) |
| *G01S 7/484* | (2006.01) |
| *G01S 7/486* | (2020.01) |
| *G01S 7/481* | (2006.01) |
| *G01S 17/26* | (2020.01) |

(52) U.S. Cl.
CPC .............. *G01S 17/88* (2013.01); *G01S 7/484* (2013.01); *G01S 7/486* (2013.01); *G01S 7/4811* (2013.01); *G01S 17/26* (2020.01)

(58) Field of Classification Search
CPC ........ G01S 17/88; G01S 7/4811; G01S 7/484; G01S 7/486
See application file for complete search history.

(56) References Cited

U.S. PATENT DOCUMENTS

| | | | | |
|---|---|---|---|---|
| 2018/0136321 | A1* | 5/2018 | Verghese | G01S 17/42 |
| 2018/0284282 | A1* | 10/2018 | Hong | H01S 5/4012 |
| 2019/0011567 | A1* | 1/2019 | Pacala | G01S 17/10 |
| 2019/0146070 | A1* | 5/2019 | Hansson | G01S 7/4812 356/5.09 |

FOREIGN PATENT DOCUMENTS

| | | | | |
|---|---|---|---|---|
| WO | WO2008133960 | * | 11/2008 | G06T 7/50 |

* cited by examiner

*Primary Examiner* — Mark Hellner
(74) *Attorney, Agent, or Firm* — Lathrop GPM LLP

(57) ABSTRACT

A receiver module for a lidar system includes a collection lens for collecting light from a scene to form an image of the light. The receiver module also includes a mask for spatially filtering the light imaged by the collection lens to at least partly transmit a light pulse backscattered from an object in the scene. The mask is opaque apart from at least one non-circular light-transmissive region. Each non-circular light-transmissive region has orthogonal length and width. The length exceeds the width and is sufficient to transmit light incident on the collection lens at a range of incidence angles in a first angular dimension. The receiver module also includes a photodetector for detecting the light pulse collected by the lens and transmitted by the mask.

23 Claims, 11 Drawing Sheets

2100

```
┌─────────────────────────────────────────────────────────────────────────┐
│                  EMIT PULSED LIGHT TOWARD A SCENE                       │
│                                 2110                                    │
│  ┌───────────────────────────────────────────────────────────────────┐  │
│  │  EMIT THE PULSED LIGHT ALONG AN EMISSION PROPAGATION DIRECTION    │  │
│  │                              2112                                 │  │
│  └───────────────────────────────────────────────────────────────────┘  │
│  ┌───────────────────────────────────────────────────────────────────┐  │
│  │ EMIT THE PULSED LIGHT AS A SERIES OF LASER PULSES CHARACTERIZED   │  │
│  │                        BY A PERIOD                                │  │
│  │                              2114                                 │  │
│  └───────────────────────────────────────────────────────────────────┘  │
└─────────────────────────────────────────────────────────────────────────┘
                                    │
                                    ▼
```

SCAN VIEWING DIRECTION, FROM WHICH LIGHT IS COLLECTED, ACROSS THE SCENE IN THE FIRST ANGULAR DIMENSION, THUS IMPOSING A POSITION SHIFT OF THE IMAGE BY AN AMOUNT THAT INCREASES WITH DISTANCE TO POINT OF BACKSCATTERING, THE POSITION SHIFT BEING PARALLEL TO THE LENGTH OF EACH NON-CIRCULAR LIGHT-TRANSMISSIVE REGION
2120

COLLECT LIGHT FROM THE SCENE, INCLUDING A LIGHT PULSE BACKSCATTERED FROM THE SCENE, TO FORM AN IMAGE OF THE LIGHT
2130

COLLECT THE LIGHT PULSE ALONG A RETURN DIRECTION THAT IS NON-COAXIAL WITH THE EMISSION PROPAGATION DIRECTION, DIFFERENCE BETWEEN THE EMISSION PROPAGATION DIRECTION AND THE RETURN PROPAGATION DIRECTION IMPOSING A POSITION SHIFT OF THE IMAGE BY AN AMOUNT THAT INCREASES WITH DISTANCE TO POINT OF BACKSCATTERING, THE POSITION SHIFT BEING PARALLEL TO THE LENGTH OF EACH NON-CIRCULAR LIGHT-TRANSMISSIVE REGION
2132

FOCUS THE LIGHT ONTO AN IMAGE PLANE
2134

FROM FIG. 21A

SPATIALLY FILTER THE LIGHT WITH A MASK THAT IS OPAQUE APART FROM AT LEAST ONE NON-CIRCULAR LIGHT-TRANSMISSIVE REGION, EACH NON-CIRCULAR LIGHT-TRANSMISSIVE REGION HAVING ORTHOGONAL LENGTH AND WIDTH, THE LENGTH EXCEEDING THE WIDTH AND BEING CONFIGURED TO TRANSMIT LIGHT COLLECTED AT A RANGE OF INCIDENCE ANGLES IN THE FIRST ANGULAR DIMENSION
2140

SPATIALLY FILTER AT THE IMAGE PLANE
2141

BLOCK LIGHT PULSES SHIFTED BY AN AMOUNT THAT EXCEEDS THE POSITION SHIFT INCURRED DURING ONE PERIOD
2142

TRANSMIT A PORTION OF THE IMAGE ASSOCIATED WITH THE LIGHT PULSE, SIZE OF THE PORTION INCREASING AS A FUNCTION OF DISTANCE TO POINT OF BACKSCATTERING
2144

BLOCK LIGHT PULSES BACKSCATTERED FROM DISTANCES SHORTER THAN A NON-ZERO MINIMUM DISTANCE AND/OR LONGER THAN A FINITE MAXIMUM DISTANCE
2146

FILTER THE IMAGE IN AN IMAGE PLANE THAT IS CURVED AND/OR AT AN OBLIQUE ANGLE TO A PROPAGATION DIRECTION OF LIGHT THAT, IN THE STEP OF COLLECTING, PASSES THROUGH A COLLECTION LENS ALONG ITS OPTICAL AXIS
2148

COLLIMATE THE LIGHT
2150

SPECTRALLY FILTER THE LIGHT
2160

DETECT THE LIGHT PULSE
2170

FIG. 21B

LIDAR WITH NON-CIRCULAR SPATIAL FILTERING

CROSS-REFERENCE TO RELATED APPLICATIONS

The present application claims the benefit of priority from U.S. Provisional Application Ser. No. 62/708,900, filed Dec. 26, 2017.

BACKGROUND

Lidar is an optical range-finding technique. A lidar system emits light pulses (e.g., pulsed laser light) toward a scene, detects light pulses backscattered from objects in a scene, and determines the time of flight of the light pulses from the transmitter to the detector. The distance to the objects in the scene may be deduced from the measured time of flights. Lidar systems may analyze the wavelength of the light pulses to determine properties of objects in the scene. Lidar systems typically employ scanning to survey an extended area.

SUMMARY

In an embodiment, a receiver module for a lidar system includes a collection lens for collecting light from a scene to form an image of the light. The receiver module also includes a mask for spatially filtering the light imaged by the collection lens to at least partly transmit a light pulse backscattered from an object in the scene. The mask is opaque apart from at least one non-circular light-transmissive region. Each non-circular light-transmissive region has orthogonal length and width. The length exceeds the width and is sufficient to transmit light incident on the collection lens at a range of incidence angles in a first angular dimension. The receiver module also includes a photodetector for detecting the light pulse collected by the lens and transmitted by the mask.

In an embodiment, a lidar method includes (a) emitting pulsed light toward a scene, (b) collecting light from the scene to form an image of the light, wherein the light includes a light pulse emitted in the step of emitting and backscattered from the scene, (c) spatially filtering the light, imaged in the step of collecting, with a mask that is opaque apart from at least one non-circular light-transmissive region, each non-circular light-transmissive region having orthogonal length and width, wherein the length exceeding the width and being configured to transmit light collected at a range of incidence angles in a first angular dimension, and (d) detecting the light pulse collected by the lens and transmitted by the mask.

BRIEF DESCRIPTION OF THE DRAWINGS

FIGS. 21A and 21B illustrate a lidar method with non-circular spatial filtering, according to an embodiment.

DESCRIPTION OF EXAMPLE EMBODIMENTS

Figure 1:
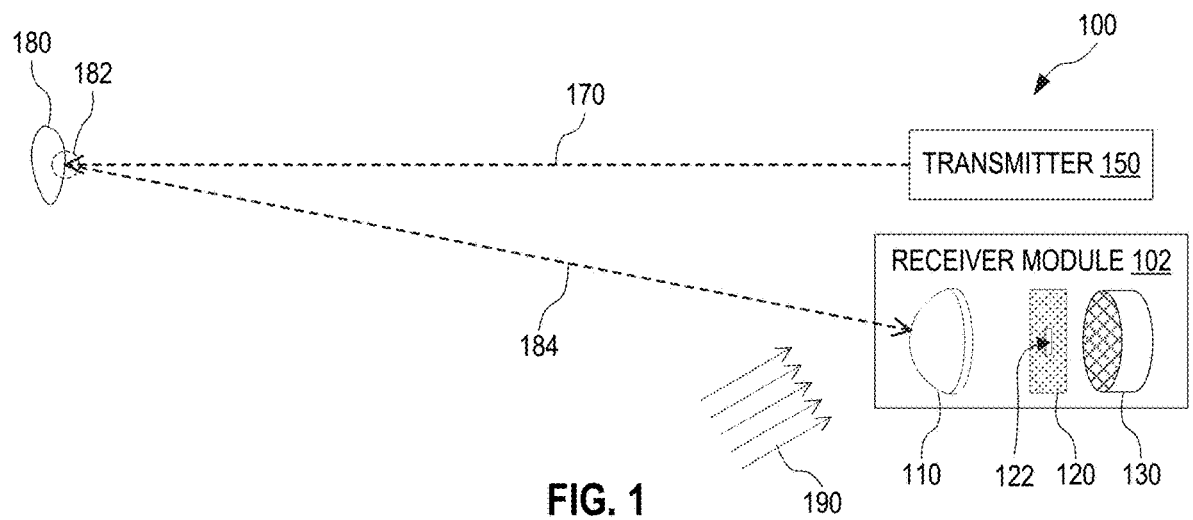
FIG. 1 illustrates a lidar system with non-circular spatial filtering, according to an embodiment.

FIG. 1 illustrates one lidar system 100 with non-circular spatial filtering. Lidar system 100 includes a transmitter 150 and a receiver module 102. Transmitter 150 emits light pulses 170 toward a scene. Transmitter 150 may include a laser, such that light pulses 170 are laser light pulses. Receiver module 102 detects one or more light pulses 184 backscattered from one or more objects 180 in the scene. Receiver module 102 includes a collection lens 110, a mask 120, and a photodetector 130.

Herein, the term "lidar" refers to both scanning lidar and non-scanning lidar. Thus, lidar system 100 may be configured/operated to scan the scene, or lidar system 100 may be configured/operated as a single-point rangefinder system for determining a distance to a target in a given direction.

In one embodiment, transmitter 150 is offset from the viewing direction of receiver module 102, as shown in FIG. 1. Without departing from the scope hereof, lidar system 100 may include one or more optical components that merge light pulses 170 into the optical path of light pulses 184 propagating toward receiver module 102. In another embodiment, not explicitly shown in FIG. 1, transmitter 150 is positioned in front of receiver module 102 in a portion of the optical path of light pulses 184 propagating toward receiver module 102.

Receiver module 102 operates as follows to detect a light pulse emitted backscattered by an object 180. Collection lens 110 collects light from the scene and forms an image of the light. Collection lens 110 may be a single lens, a plurality of lenses, or a composite lens. The light includes a light pulse 184. Mask 120 spatially filters the image of the light collected by collection lens light pulse 184. Mask 120 is opaque apart from a non-circular light-transmissive region 112. Region 122 may be an aperture in mask 120, or a fully or partly light-transmissive window in mask 120. Photodetector 130 detects light transmitted by region 122 of mask 120. When light pulse 184, or a portion thereof, is transmitted by region 122, photodetector 130 detects light pulse 184. Lidar system 100 may further include electronic circuitry (not shown in FIG. 1) that determines a time of flight of light pulse 184 based upon the detection of light pulse 184 by photodetector 130.

Mask 120 may help block ambient light 190 collected by collection lens 110, so as to improve the signal-to-background ratio of measurement of light pulse 184 by photodetector 130. Compared to a conventional circular aperture, the non-circular shape of region 122 may be tailored to optimize the detection of light pulses 184 according to the configuration and use of lidar system 100. For example, region 122 may be shaped to reduce of minimize transmission of ambient light 190 so as to suppress its detection, while allowing for detection of light pulses 184 incident on receiver module 102 at a range of angles such as may be experienced during scanning of lidar system 100 and/or due to a spatial offset between receiver module 102 and transmitter 150. For both scanning and non-scanning implementations of lidar system 100, the non-circular shape of region 122 may also be tailored to limit the range of distances surveyed by lidar system 100, and/or reduce the dynamic range of signal strength that photodetector 130 and associated electronic circuitry must handle in order to detect light pulses 184 backscattered from a range of distances. In scanning embodiments of lidar system 100, the non-circular shape of region 122 may further be tailored to reduce or eliminate range aliasing resulting from late arrival of light pulses 184 from distant objects.

In one embodiment, mask 120 is an opaque material with an aperture that forms region 122. In another embodiment, mask 120 is a transparent substrate with an opaque coating, wherein an opening in the opaque coating forms region 122.

Without departing from the scope hereof, receiver module 102 may be provided as a standalone receiver module suitable for implementation in a third-party lidar system, for example together with a third-party transmitter 150.

Figure 2:
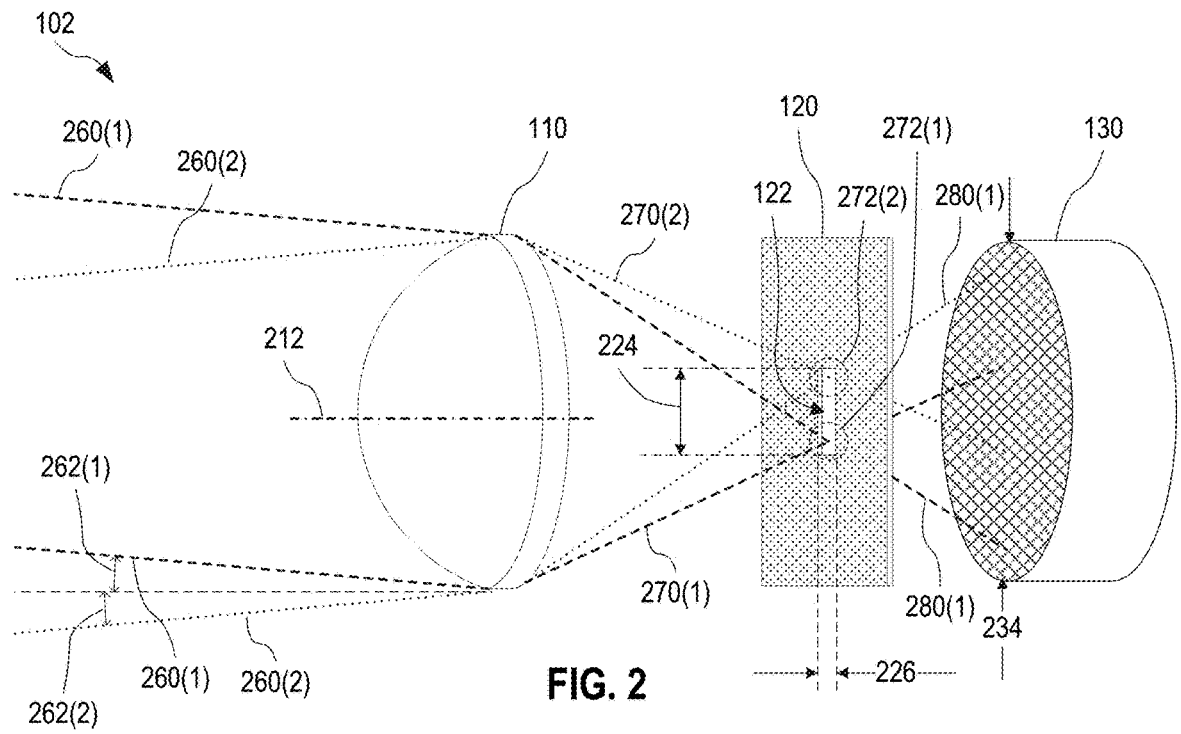
FIGS. 2 and 3 illustrate, in further detail, a receiver module and a mask of the lidar system of FIG. 1, according to an embodiment.
Figure 3:
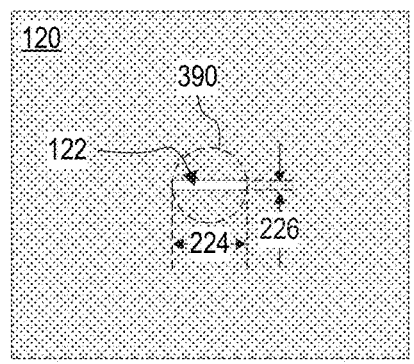

FIGS. 2 and 3 illustrate receiver module 102 and mask 120 and their function in further detail. FIG. 2 is a perspective view of receiver module 102, and FIG. 3 is a front view of mask 120. FIGS. 2 and 3 are best viewed together in the following description. Region 122 of mask 120 has orthogonal length 224 and width 226. Length 224 exceeds width 226 and is sufficient to transmit light (e.g., light pulses 184) incident on collection lens 110 at a range of incidence angles in a first angular dimension relative to the optical axis 212 of collection lens 110. Length 224 is in the plane of this first angular dimension.

As an illustrative example, FIG. 2 shows light 260(1) and 260(2) incident on collection lens 110 at two different respective angles 262(1) and 262(2) relative to optical axis 212 in the angular dimension coplanar with length 224. Collection lens 110 focuses incident light 260(1) and 260(2) to form respective focused light 270(1) and 270(2). Due to the difference between angles 262(1) and 262(2), focused light 270(1) and 270(2) form images at two different respective positions 272(1) and 272(2). Mask 120 spatially filters light imaged by collection lens, for example to reduce or minimize transmission of ambient light 190 so as to suppress detection thereof. However, the elongated shape of region 122 allows receiver module 102 to detect both light 260(1) and 260(2) as light 280(1) and 280(2), respectively, transmitted by region 122.

If, instead of using mask 120 with non-circular region 122, receiver module 102 implemented a conventional circular aperture 390 (overlaid on mask 120 in FIG. 3) sized to allow detection of both light 260(1) and 260(2), a significantly larger amount of ambient light 190 would be allowed to pass through aperture 390. As compared to conventional circular aperture 390, non-circular region 122 is shaped to more selectively transmit light pulses 184.

Mask 120 may be (but does not need to be) positioned at an image plane of collection lens 110. The spot size of light pulse 184 is smallest at the image plane, and optimal suppression of ambient light 190 relative to transmission of light pulse 184 may therefore be achieved at the image plane. However, the distance from collection lens 110 to the image of light pulse 184 depends on the distance from collection lens 110 to object 180. This dependence is stronger at short distances than at long distances, where the image plane may be measurably closer to collection lens 110 than the focal length of collection lens 110. Therefore, as discussed in further detail below in reference to FIGS. 4, 5, 16, and 17, the image plane of collection lens 110 may be more complex than a simple geometrical plane. Generally, collection lens 110 performs a Fourier transform, wherein the incidence angle of light 260 onto collection lens 110 is transformed to a position on the image plane of collection lens 110.

In certain use scenarios, at least some of light pulses 184 collected by collection lens 110 (and transmitted by mask 120) are weak. Consider, for example, FIG. 1 and lidar system 100. Object 180 may scatter a light pulse 170 diffusely, or at least in part non-specularly, such that the power of light pulse 170 is redistributed in a wide range of directions. Only a relatively narrow cone of this redistributed power of light pulse 170 propagates toward receiver module 102 as light pulse 184. In this scenario, the fraction of the power of light pulse 170 transmitted to receiver module 102 in light pulse 184 scales inversely with the squared distance between object 180 and receiver module 102, such that a light pulse 184 backscattered from a distant object 180 may have very low power.

Although, the problem of weak backscattering from distant objects may be partly remedied by implementing a high-power laser source in transmitter 150, even a high-power laser source may be insufficient and is, due to laser-safety considerations, often less attractive. Thus, practical implementations of receiver module 102 may benefit from a very sensitive photodetector 130, such as a sensitive, large-area photodetector having an active area characterized by transverse dimensions 234 that significantly exceed width 226 and also exceed length 224 (for clarity of illustration, only one transverse dimension 234 is indicated in FIG. 2). In one such implementation, photodetector 130 is a high-gain silicon photomultiplier that includes an array of binary microcells. Each of the binary microcells responds in full to a single photon. To better distinguish detection of a light pulse 184 from a spurious sensor signal or detection of ambient light 190, the silicon photomultiplier may have many microcells. To accommodate a large number of microcells, receiver module 102 may implement a silicon photomultiplier having transverse dimensions 234 of at least 0.25 millimeters, for example in the range between 1 and 6 millimeters. The performance of the silicon photomultiplier generally is better when illuminated relatively uniformly rather than being subjected to a small focused light spot. The spot size of light pulse 184 at mask 120 may be characterized by transverse dimensions in the range between 10 and 100 microns. In one embodiment, receiver module 102 implements a silicon photomultiplier positioned sufficiently far from the image plane of collection lens 110 to allow light pulse 184 to diverge significantly before reaching the silicon photomultiplier. For example, the silicon photomultiplier may be positioned at a distance from the focal point of collection lens 110 that allows light pulse 184 to expand to a transverse size that is at least 80% of transverse dimension 234.

Although shown in FIGS. 1, 2, and 3 as being rectangular, the shape of non-circular region 122 may be non-rectangular, without departing from the scope hereof. For example, width 226 may vary along length 224. Similarly, mask 120 may be non-rectangular, for example circular, without departing from the scope hereof. It is further understood that receiver module 102 may include additional optical elements not shown in FIGS. 1, 2, and 3. For example, receiver module 102 may include a collimation lens between mask 120 and photodetector 130, and/or receiver module 102 may include one or more reflectors to fold the optical path through receiver module 102 such that not all of collection lens 110, mask 120, and photodetector 130 are coaxial.

Figure 4:
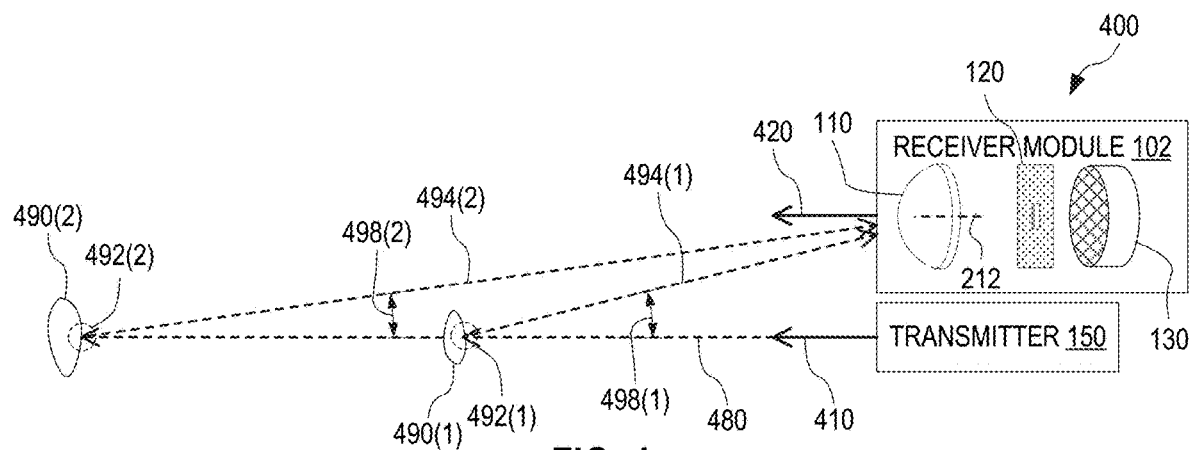
FIG. 4 illustrates a lidar system having non-coaxial transmission and detection, according to an embodiment.

FIG. 4 illustrates one lidar system 400 having non-coaxial transmission and detection. Lidar system 400 implements non-circular spatial filtering to selectively detect backscattered light while accommodating a range of backscattering directions resulting from the non-coaxial transmission and detection. Lidar system 400 is an embodiment of lidar system 100. Lidar system 400 includes transmitter 150 and receiver module 102. Transmitter 150 emits light pulses 480 toward a scene along an emission direction 410. Receiver module 102 is configured to collect light from the scene along a viewing direction 420. Viewing direction 420 may coincide with optical axis 212 of collection lens 110. Alternatively, lidar system 400 includes one or more additional optical components (e.g., a folding mirror) that redirect viewing direction 420 of receiver module 102 to be non-coaxial with optical axis 212, while also being non-coaxial with emission direction 410. It is understood that each of emission direction 410 and viewing direction 420 may represent a center axis of a cone of non-zero angular extent. Emission direction 410 and viewing direction 420 may be parallel or non-parallel.

Since emission direction 410 and viewing direction 420 are non-coaxial, the return direction toward receiver module 102 of light pulses 494 backscattered by an object 490 and collected by collection lens 110 depends on the distance of object 490 from lidar system 400. For example, a light pulse 494(1), backscattered at a near point 492(1) by a near object 490(1) and collected by collection lens 110, propagates toward receiver module 102 at an angle 498(1), whereas a light pulse 494(2), backscattered at a distant backscatter point 492(2) by a distant object 490(2) and collected by collection lens 110, propagates toward receiver module 102 at a smaller angle 498(2). As a result, light pulses 494(1) and 494(2) are incident on collection lens 110 at two different angles. More generally, a range of distances between lidar system 400 and backscatter points 492 corresponds to a range of incidence angles of light pulses 494 onto collection lens 110. Lidar system 400 implements receiver module 102 such that the orientation of the long axis of light-transmissive region 122 (parallel to length 224) is coplanar with the angular range of distance-dependent incidence angles of light pulses 494 onto collection lens 110. Receiver module 102 thus allows for detection of light pulses 494 backscattered from a range of distances, while effectively suppressing undesirable detection of other light, such as ambient light 190.

Region 122 of mask 120 may be sized and positioned in lidar system 400 to select only a particular range of backscattering distances for detection. In one embodiment, region 122 is sized and positioned to reduce, minimize, or block transmission of light pulses 494 backscattered from distances shorter than a non-zero minimum distances. This configuration may be used to prevent detection of light pulses 494 backscattered from a component of lidar system itself and/or from nearby portions of the scene that are not of interest. In another embodiment, region 122 is sized and positioned to reduce, minimize, or block transmission of light pulses 494 backscattered from distances longer than a finite maximum distance. This configuration may be used to prevent detection of light pulses 494 backscattered from distant portions of the scene that are not of interest.

Since (a) a range of distances between lidar system 400 and backscatter points 492 corresponds to a range of incidence angles of light pulses 494 onto collection lens 110, (b) there is a one-to-one correspondence between incidence angle onto collection lens 110 and position of the image formed by collection lens 110 on its image plane (as per the Fourier transform), and (c) the focal distance decreases with the distance from lidar system 400 to backscatter point 492, the image plane of collection lens 110 in lidar system 400 may not simply be a plane orthogonal to optical axis 212 of collection lens 110. For example, if collection lens 110 is a thin lens or behaves like a thin lens, the image plane of collection lens 110 is curved in the dimension coplanar with the offset vector between receiver module 102 and transmitter 150. In this situation, if the curved image plane of collection lens 110 in lidar system 400 is approximated by a plane, the curved image plane is best approximated by a plane that is at an oblique angle to optical axis 212. It is understood that the refraction properties of collection lens 110 may also affect the shape of the image plane of collection lens 110 in lidar system 400. Although mask 120 may provide more accurate spatial filtering when positioned at the image plane of collection lens 110, mask 120 does not need to be positioned exactly at the image plane. The spatial filtering provided by mask 120 may be sufficiently effective even if mask 120 is positioned slightly closer to or farther from collection lens 110 than the image plane.

Figure 5:
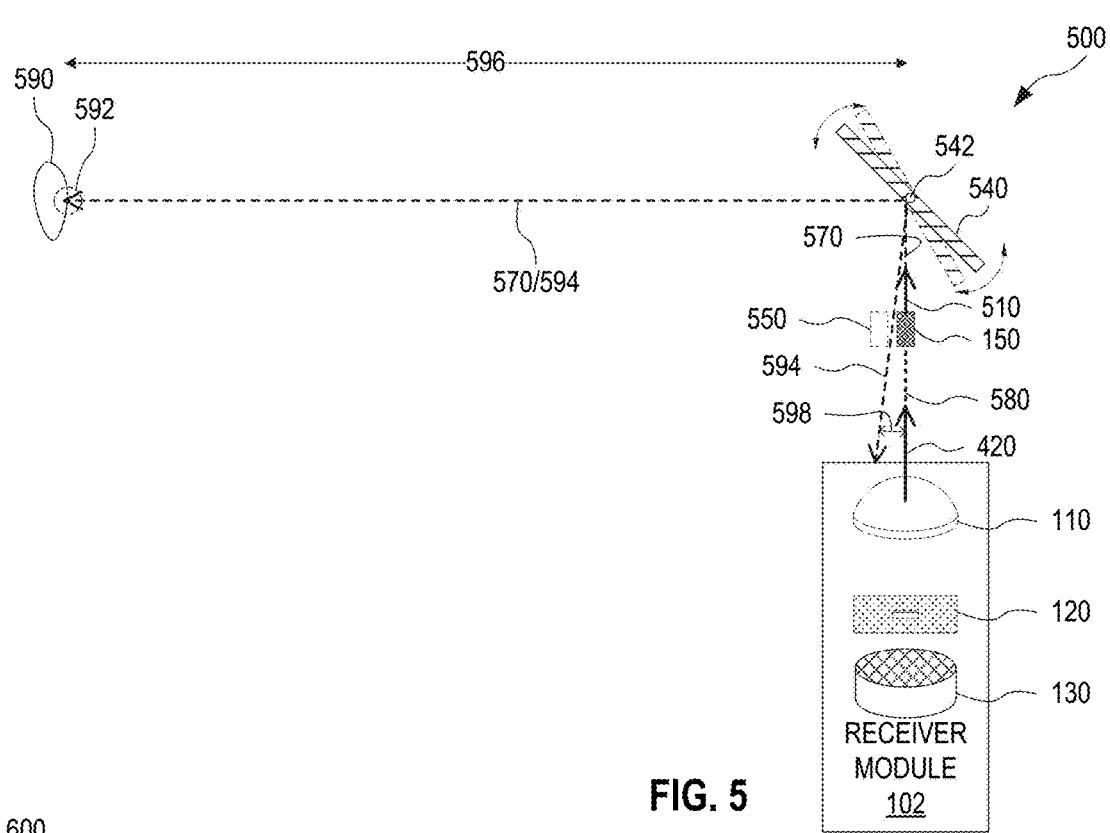
FIG. 5 illustrates a scanning lidar system having coaxial transmission and detection, according to an embodiment.

FIG. 5 illustrates one scanning lidar system 500 having coaxial transmission and detection. Scanning lidar system 500 implements non-circular spatial filtering to selectively detect backscattered light while accommodating a range of return directions resulting from scanning of scanning lidar system 500. Scanning lidar system 500 includes transmitter 150, receiver module 102 and a scanning optic 540. Scanning optic 540 may be a mirror, a prism, a phased array spatial-light-modulator, or another scanning optics or electrooptical scanning device as known in the art. In the example illustrated in FIG. 5, scanning optic 540 is a mirror that rotates about an axis 542.

Transmitter 150 emits light pulses 570 toward scanning optic 540 along an emission direction 510. Emission direction 510 is coaxial with viewing direction 420 of receiver module 102. In one embodiment (shown in FIG. 5), transmitter 150 is positioned on the axis of viewing direction 420. In another embodiment, transmitter 150 is positioned elsewhere, but the transmission path from transmitter 150 is merged with the detection path, associated with receiver module 102, at a location between receiver module 102 and scanning optic 540. Scanning optic 540 deflects both (a) light pulses 570 transmitted by transmitter 150 and (b) associated light pulses 594 backscattered at a point 592 by an object 590 and collected by collection lens 110.

If scanning optic 540 is stationary during the combined travel time of a light pulse 570 from scanning optic 540 to object 590 and an associated backscattered light pulse 594 from object 590 to scanning optic 540, or scanned so slowly as to not move significantly during this combined travel time, the return direction of light pulse 594 to receiver module 102 is coaxial with emission direction 510. (It is understood that the transverse extent of light pulse 594, collected by collection lens 110, may exceed the area blocked by transmitter 150, or blocked by merging optics such as a beamsplitter, such that a portion of light pulse 594 reaches collection lens 110.) However, more rapid scanning of scanning optic 540 results in the return direction of light pulse 594 differing from emission direction 510 by an angle 598. Angle 598 is an increasing function of the distance 596 to point 592 of backscattering. Angle 598 is also an increasing function of the scan rate of scanning optic 540. For a constant scan rate, a range of distances 596 corresponds to a range of incidence angles of light pulses 594 onto collection lens 110. Scanning lidar system 500 implements receiver module 102 such that the orientation of the long axis of light-transmissive region 122 (parallel to length 224) is coplanar with the angular range of distance-dependent incidence angles of light pulses 594 onto collection lens 110. Receiver module 102 thus allows for detection of light pulses 594 backscattered from a range of distances, while effectively suppressing undesirable detection of other light, such as ambient light 190.

Although not shown in FIG. 5, scanning lidar system 500 may employ two-dimensional scanning, without departing from the scope hereof. For example, receiver module 102 and scanning optic 540 may be mounted on a common rotation mount that scans the propagation direction of light pulses 570 from scanning optic 540 in second angular dimension orthogonal to the view of FIG. 5. In such two-dimensional scanning embodiments of scanning lidar system 500, region 122 of mask 120 may be tilted such that length 224 is parallel to the vector sum of the combined two-dimensional scanning. However, if scanning in the second angular dimension is much slower than scanning in the angular dimension shown in FIG. 5, it may be unnecessary to tilt region 122.

Also in scanning lidar system 500, region 122 of mask 120 may be sized and positioned to select only a particular range of backscattering distances for detection. In one embodiment, region 122 is sized and positioned to reduce, minimize, or block transmission of light pulses 594 backscattered from distances shorter than a non-zero minimum distances. This configuration may be used to prevent detection of light pulses 594 backscattered from a component of lidar system itself and/or from nearby portions of the scene that are not of interest. In another embodiment, region 122 is sized and positioned to reduce, minimize, or block transmission of light pulses 594 backscattered from distances longer than a finite maximum distance. This configuration may be used to prevent detection of light pulses 594 backscattered from distant portions of the scene that are not of interest.

Since (a) a range of distances 596 between scanning lidar system 500 and backscatter points 592 corresponds to a range of incidence angles of light pulses 594 onto collection lens 110, (b) there is a one-to-one correspondence between incidence angle onto collection lens 110 and position of the image formed by collection lens 110 on its image plane (as per the Fourier transform), and (c) the focal distance decreases with distance 596, the image plane of collection lens 110 in scanning lidar system 500 is not simply a plane orthogonal to optical axis 212 of collection lens 110. Instead, the image plane of collection lens 110 is curved in the dimension coplanar with the scanning direction of scanning optic 540. If approximated by a plane, the curved image plane of collection lens 110 in scanning lidar system 500 is best approximated by a plane that is at an oblique angle to optical axis 212.

The embodiments of FIGS. 4 and 5 may be combined and extended to a scanning lidar system having non-coaxial transmission and emission. In one non-coaxial modification of scanning lidar system 500, transmitter 150 is offset from the axis associated with viewing direction 420 while still being positioned between collection lens 110 and scanning optic 540. For example, transmitter 150 may be positioned in location 550 indicated in FIG. 5. The offset of transmitter 150 from the axis of viewing direction 420 may be parallel to length 224 of region 122 of mask 120 (as indicated by location 550, for example), perpendicular to length 224, or at an oblique angle to length 224. In another non-coaxial modification of scanning lidar system 500, transmitter 150 is offset from the axis associated with viewing direction 420, and transmitter 150 is configured with its own scanning optic that is scanned synchronously with scanning optic 540.

Figure 6:
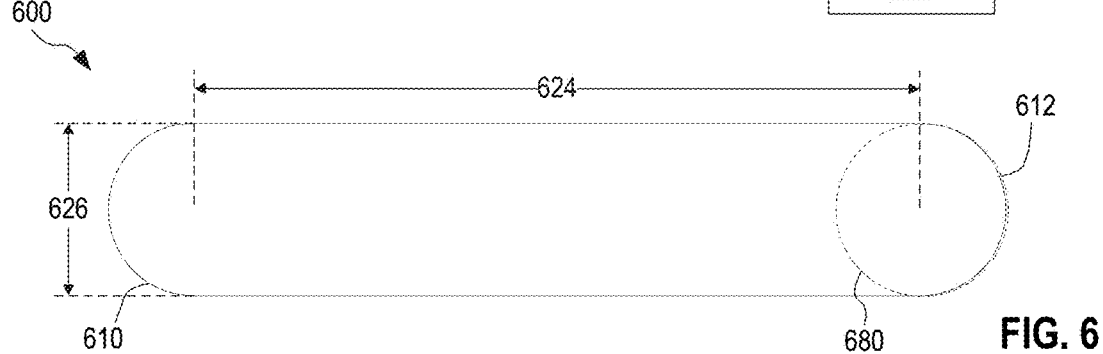
FIG. 6 illustrates a non-circular light-transmissive region of a mask for spatially filtering light, according to an embodiment.

FIG. 6 illustrates one non-circular light-transmissive region 600 of a mask for spatially filtering light. Region 600 is an embodiment of region 122 of mask 120. Region 600 has length 624 and width 626. Width 626 is constant apart from ends 610 and 612 of region 600. The shape of ends 610 and 620 may be circular or square or another shape. In one implementation, width 626 is set to substantially match the spot size of light pulses 184 incident on mask 120 at end 612. The aspect ratio of length 624 to width 626 may be in the range between 3 and 10. In one example, length 624 is in the range between 100 and 500 microns (e.g., between 150 and 250 microns) and width 626 is in the range between 20 and 100 microns (e.g., between 40 and 60 microns).

Figure 7:
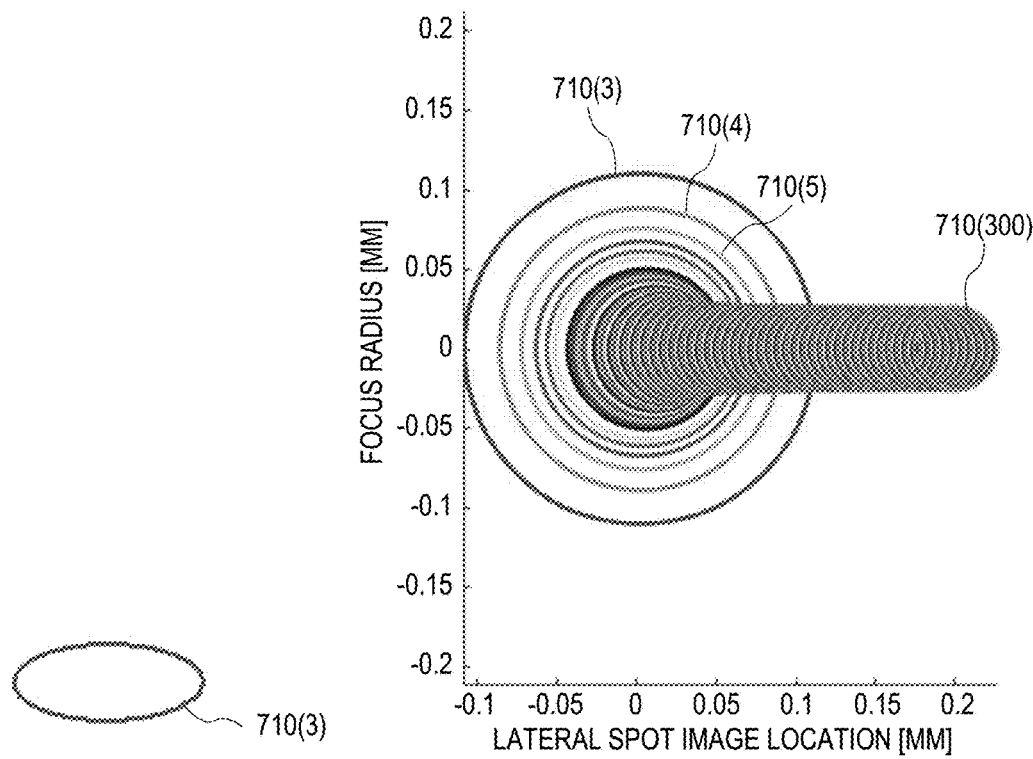
FIGS. 7 and 8 illustrate example properties of light spots formed by a collection lens of the receiver module of FIG. 2 on its image plane, in one example of the receiver module in the scanning lidar system of FIG. 5 employing a laser transmitter.
Figure 8:
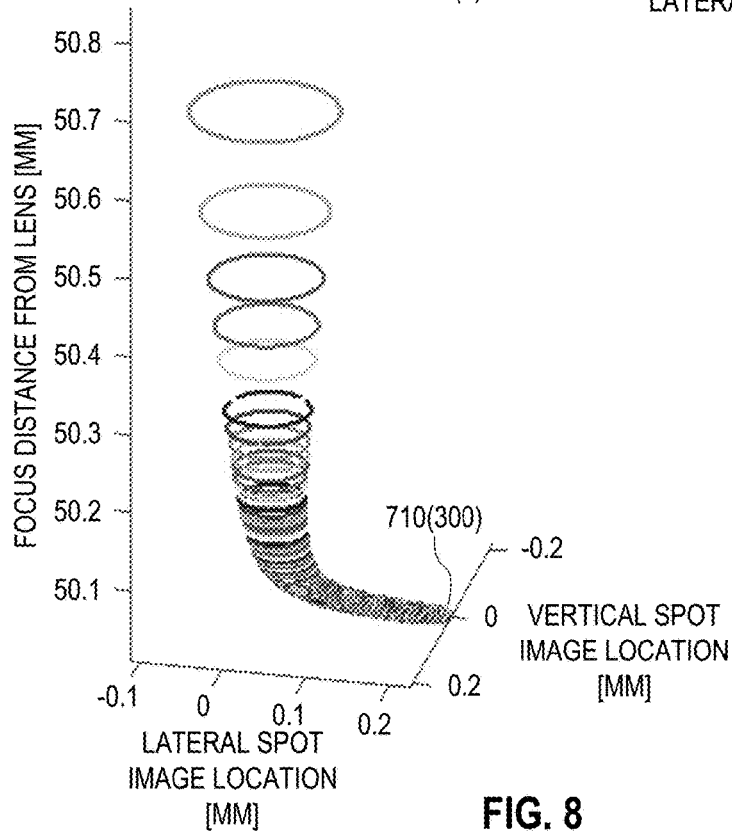

FIGS. 7 and 8 illustrate example properties of light spots formed by collection lens 110 on its image plane, in one example of receiver module 102 in scanning lidar system 500 employing a laser transmitter. In this example, collection lens 110 has a focal length of 50 millimeters, the scanning rate of scanning optic 540 is 1000 radians per second (such that the propagation direction of light pulses 570 toward the scene is scanned a 2000 radians per second), the scanning of scanning optic 540 is one-directional, and the initial spot diameter of laser pulses emitter by transmitter 150 is 10 millimeters and the divergence is 1 milliradian. Although the plotted properties of the light spots are not affected by the pulse rate of the laser transmitter, an example use scenario may operate with a pulse rate of 100,000-1,000,000 pulses per second, such as approximately 400,000 pulses per second.

FIG. 7 shows, for a range of distances 596 from scanning optic 540 to backscattering point 592, focus radius (spot size) and lateral image location (in direction parallel to length 224) of light pulse 594. The range of distances 596 plotted in FIG. 7 is 3-300 meters, in one-meter increments. FIG. 8 shows, for the same distances 596 as in FIG. 7, focus radius (spot size), focus distance from collection lens 110, and both lateral and vertical image location (in direction parallel to width 226). FIGS. 7 and 8 are best viewed together in the following description.

Each ring 710(N) corresponds to the spot size of a focused image of a light pulse 594 backscattered from a distance 596 that is N meters. Over the range of distances 596 from 3 to 300 meters, the lateral spot image location shifts by 0.2 millimeters. It is evident that the spot size decreases with distance 596. At short distances 596, this decrease is rapid. The focus distance from collection lens 110 also decreases with distance 596 (as is expected from the thin lens equation). The focus distance decrease is more rapid at short distances than at long distances.

Data such as that shown in FIGS. 7 and 8, whether measured or simulated, may be used to design an optimal configuration of region 122 of mask 120. In one design method, the optimal configuration of region 122 is determined based at least in part upon (a) the desired range of distances to be surveyed, the scanning rate, and optical properties of collection lens 110.

Figure 9:
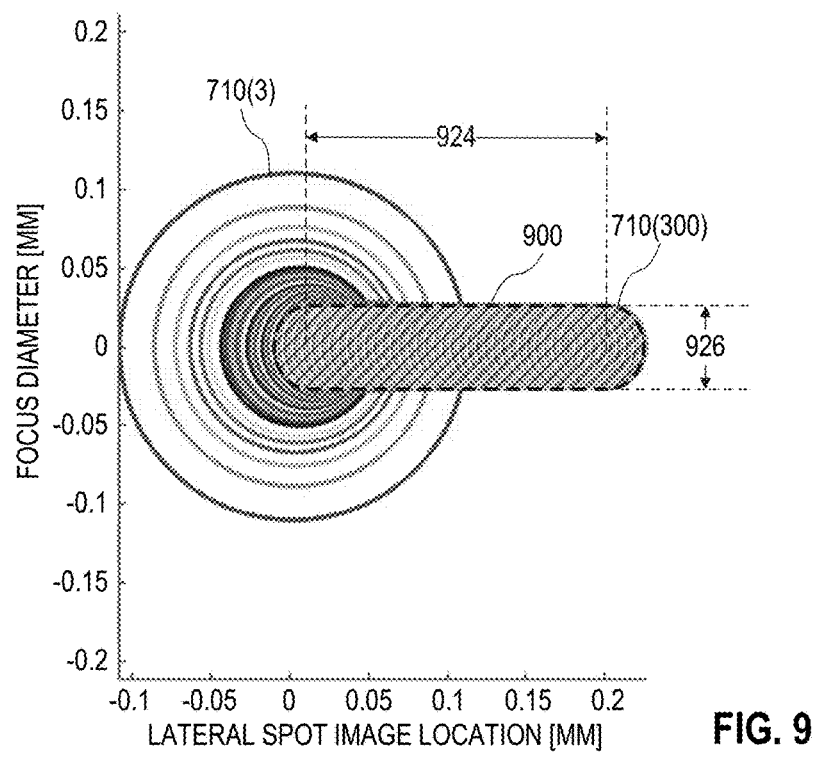
FIG. 9 shows transmission properties of a non-circular light-transmissive region of a mask for spatially filtering light, according to an embodiment.

FIG. 9 shows transmission properties of one non-circular light-transmissive region 900 of a mask for spatially filtering light. Region 900 is an example of region 600 tailored to transmit light pulses 594 in the example of scanning lidar system 500 discussed above in reference to FIGS. 7 and 8. FIG. 9 overlays region 900 on the FIG. 7 data and shows the portions of spot images (indicated by rings 710(N)) that are transmitted by region 900. Region 900 has length 924 and width 926. Length 924 and width 926 are examples of length 624 and width 626. Length 924 is 200 microns, and width 926 is 52 microns. The thickness of a substrate forming mask 120 with region 900 may advantageously be significantly less than width 626, such as less than 12 microns, so as to prevent undesirable clipping of light entering the collection lens side of region 900 and diverging before emerging from the detector side of region 900.

Length 924 is sufficient to transmit light pulses 594 from distances 596 up to 300 meters, when assuming one-directional scanning of scanning optic 540. If region 900 was extended to negative values of the lateral spot image location, such that length 924 spans from −0.2 millimeters to 0.2 millimeters, region 900 would be able to transmit light pulses 594 from distances 596 up to 300 meters with two-directional scanning of scanning optic 540. However, this extended version of region 900 would allow for transmission of an increased amount of ambient light.

Width 926 matches the spot size at a distance 596 of 300 meters but is noticeably smaller than the spot size at distances 596 less than 20 meters. As a result, the fraction of a light pulse 594 transmitted by region 900 decreases as distance 596 decreases. However, since the power of light pulse 594 generally scales with the inverse squared value of distance 596, there is significantly more power in light pulses 594 associated with short distances 596 than in light pulses 594 associated with long distances 596. Rather than operating with a light-transmissive region 122 having increased width at the lateral spot image locations corresponding to short distances 596, it may be more advantageous to sacrifice detection of some fraction of light pulses 594 associated with short distances 596 so as to better suppress ambient light. Alternatively, light-transmissive region 122 may be shaped to better match the spot size dependence on distance 596, for example if reliability is more important than accuracy and/or if short-range detection is of greater interest than long-range detection.

FIG. 9 illustrates how region 900 selects laser pulses 594 backscattered from a range of distances 596. Region 900 may be modified, or its position shifted laterally, to select a different range of distances 596 for detection by receiver module 102. It is understood that the range limits are not sharp cut-offs, but rather gradual declines, since the spot image size is such that spot images associated with different distances 596 overlap on the image plane of collection lens 110.

Figure 10:
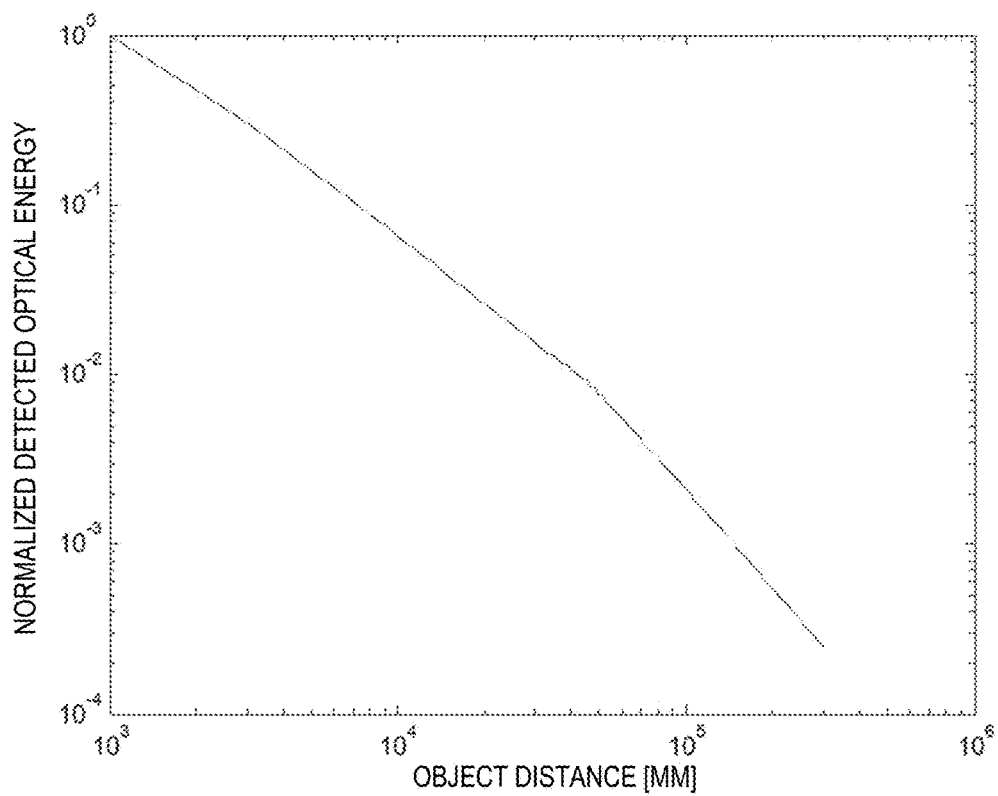
FIG. 10 plots an example of detected optical energy as a function of distance to the point of backscattering when implementing the light-transmissive region of FIG. 9.

FIG. 10 plots the detected optical energy as a function of distance 596 to the point of backscattering (object distance) when implementing region 900 in the example of scanning lidar system 500 discussed above in reference to FIGS. 7 and 8. The detected optical energy is normalized to one at a distance 596 of 1 meter and it is assumed that the power of light pulses 594 scales with the inverse squared value of distance 596. The normalized detected optical energy decreases with distance 596. Over the range of distances 596 spanning from 1 to 300 meters, the normalized detected optical energy spans a dynamic range that is less than 5000. For comparison, if region 900 was shaped to admit the full spot image size for all distances 596 in this range, the normalized detected optical energy would span a dynamic range of approximately 90,000.

Accurate determination of the time-of-flight of light pulses 570/594 may be adversely affected if the load of photodetector 130 changes by several orders of magnitude across the evaluated range of distances 596. Reduction of the dynamic range of detected optical power may therefore be advantageous. As shown in FIG. 10, a light-transmissive region of constant width helps reduce this dynamic range.

Figure 11:
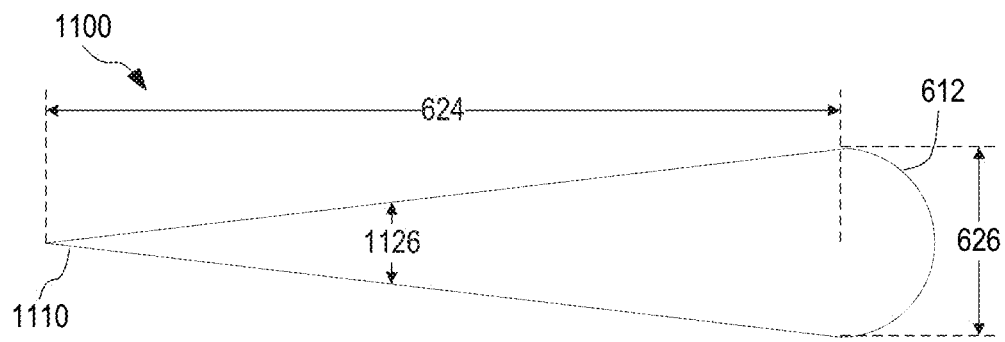
FIG. 11 illustrates a non-circular light-transmissive region having tapered width, according to an embodiment.

FIG. 11 illustrates one non-circular light-transmissive region 1100 having tapered width. Region 1100 is an embodiment of region 122 of mask 120. Region 1100 is a tapered modification of region 600. The tapered width 1126 of region 1100 may further reduce the dynamic range of the detected optical power over a range of distances. Region 1100 has length 624 between end 612 and an end 1110 (replacing end 610). Region 1100 has a non-uniform width 1126 that decreases from width 626 at end 612 to zero at end 1110. As compared to region 600, region 1100 reduces ambient light transmission by approximately 50%.

In an alternative embodiment, not shown in FIG. 11, width 1126 is greater than zero at end 1110.

Figure 12:
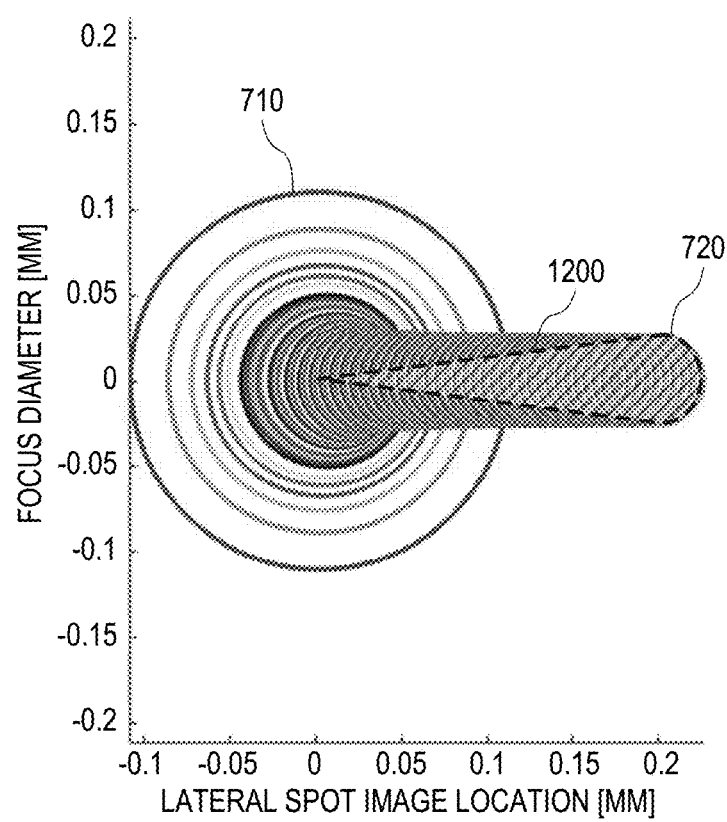
FIG. 12 illustrates an example of selection by light-transmissive region of FIG. 11 of laser pulses backscattered from a range of distances.

FIG. 12 illustrates how region 1100 selects laser pulses 594 backscattered from a range of distances 596 when region 1100 is implemented in the example of scanning lidar system 500 discussed above in reference to FIGS. 7 and 8. FIG. 12 overlays region 1100 on the FIG. 7 data and shows the portions of spot images (indicated by rings 710(N)) that are transmitted by region 1100. It is evident that the fraction of light pulse 594 transmitted by region 1100 decreases strongly as distance 596 gets smaller. Thus, as compared to the data plotted in FIG. 10, region 1100 further reduces the dynamic range of the detected optical power.

Figure 13:
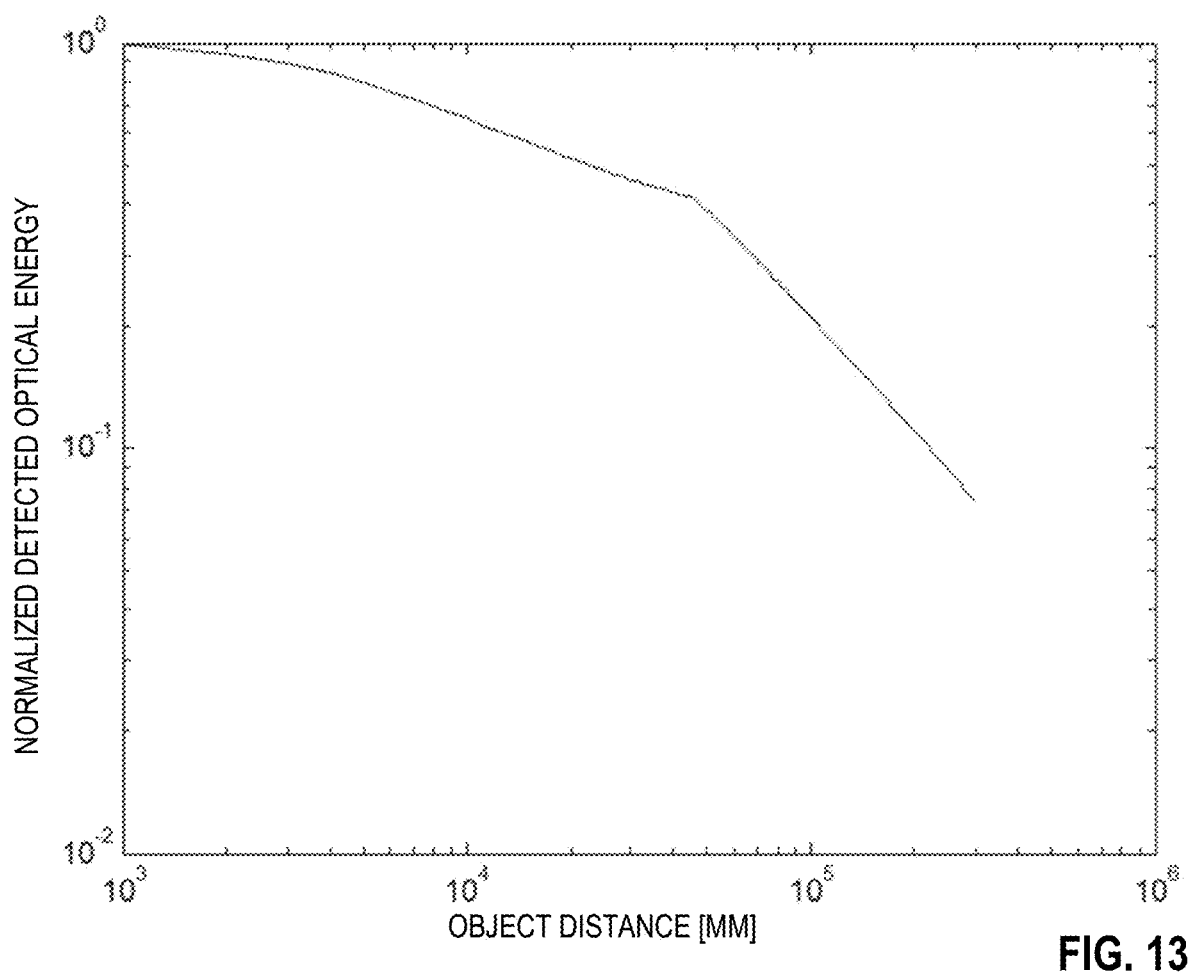
FIG. 13 plots an example of detected optical energy as a function of distance to the point of backscattering when implementing the light-transmissive region of FIG. 11.

FIG. 13 plots the detected optical energy as a function of distance 596 to the point of backscattering (object distance) when region 1100 is implemented in the example of scanning lidar system 500 discussed above in reference to FIGS. 7 and 8. The detected optical energy is normalized to one at a distance 596 of 1 meter and it is assumed that the power of light pulses 594 scales with the inverse squared value of distance 596. The normalized detected optical energy decreases with distance 596. Over the range of distances 596 spanning from 1 to 300 meters, the normalized detected optical energy spans a dynamic range that is less than 15. This is a significant reduction in dynamic range, as compared to the dynamic range achieved with region 900 (see FIG. 10).

Figure 14:
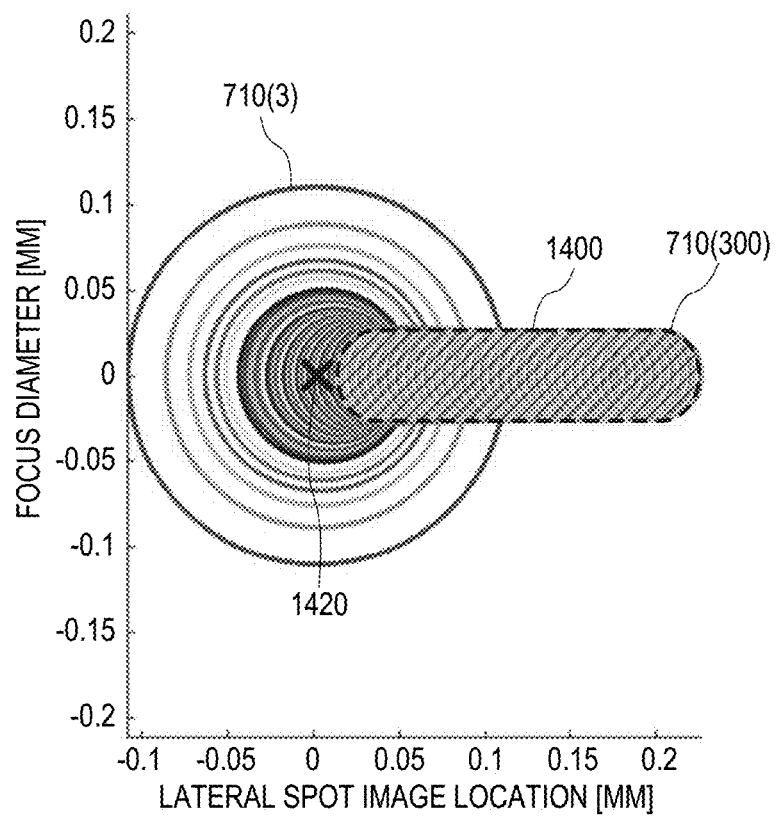
FIG. 14 illustrates an example implementation of another non-circular light-transmissive region having constant width.

FIG. 14 illustrates implementation in the example of scanning lidar system 500 discussed above in reference to FIGS. 7 and 8 of another non-circular light-transmissive region 1400 having constant width. Region 1400 is an embodiment of region 122 and is similar to region 600 and region 900. FIG. 14 overlays region 1400 on the FIG. 7 data and shows the portions of spot images (indicated by rings 710(N)) that are transmitted by region 1100. As compared to region 900, region 1400 is truncated at the end associated with short distances 596. This truncation reduces the dynamic range of the detected optical power across the evaluated range of distances 596. In regards to the dynamic range of the detected optical power, the truncation of region 1400 is an alternative to the tapered profile of region 1100.

Without departing from the scope hereof, lidar system 400 may employ a mask 120 configured with any one of regions 600, 900, 1100, and 1400. However, in scanning lidar system 500, the shift in lateral spot image location is proportional to the distance to the point of backscatter, whereas, in non-coaxial lidar system 400, the shift in lateral spot image location is inversely proportional to the distance to the point of backscatter. Thus, the optimal configuration of any one of regions 600, 900, 1100, and 1400 in non-coaxial lidar system 400 may be different from the optimal configuration of regions 600, 900, 1100, and 1400 in scanning lidar system 500. Yet, some general trends are the same in non-coaxial lidar system 400 and scanning lidar system 500. For example, the spot size and detected optical power decreases with distance to the point of backscattering in both non-coaxial lidar system 400 and scanning lidar system 500. It is further understood that any one of regions 600, 900, 1100, and 1400 may be implemented in a modification of scanning lidar system 500 that have non-coaxial transmission and detection (for example as discussed above in reference to FIGS. 4 and 5). For such a system, the specific configuration of any one of regions 600, 900, 1100, and 1400 may be optimized based upon a consideration of both (a) the lateral spot image location shift caused by scanning and (b) the lateral spot image location shift caused by the non-coaxial transmission and detection arrangement.

Figure 15:
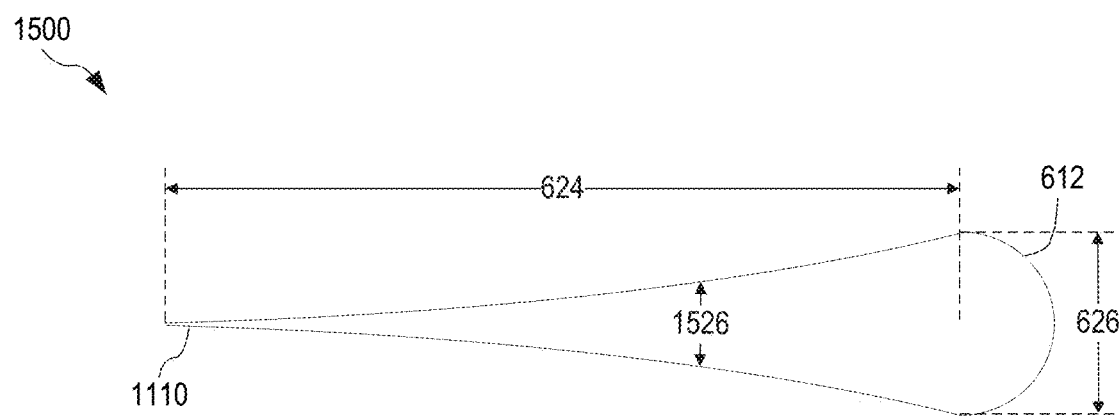
FIG. 15 illustrates a non-circular light-transmissive region having non-linearly tapered width, according to an embodiment.

FIG. 15 illustrates one non-circular light-transmissive region 1500 having a non-linearly tapered width. Region 1500 is an embodiment of region 122 of mask 120. Region 1500 is a modification of region 600 characterized by a non-linearly tapered width 1526. As compared to region 1100, region 1500 further reduces the dynamic range of the detected optical power.

Figure 16:
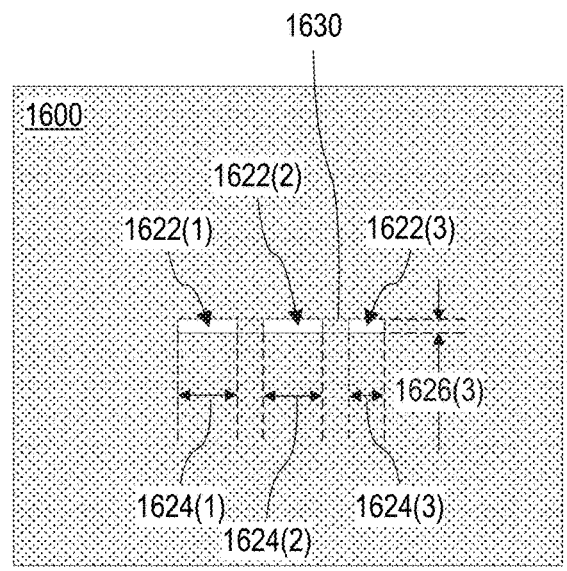
FIG. 16 illustrates a mask with a plurality of light-transmissive regions, according to an embodiment.

FIG. 16 illustrates one mask 1600 with a plurality of light-transmissive regions 1622. Mask 1600 is an extension of mask 120 and may be implemented in any one of lidar system 100, non-coaxial lidar system 400, and scanning lidar system 500, without departing from the scope hereof. Although FIG. 16 shows three regions 1622, it is understood that mask 1600 may form two, four, or more regions 1622. Each region 1622 has orthogonal length 1624 and width 1626. Lengths 1624 of the plurality of regions 1622 are aligned with each other such that regions 1622 are at the same location in the dimension parallel to width 1626. Length 1624 may be the same for all regions 1622, or one or more lengths 1624 may differ from each other. Similarly, width 1626 may be the same for all regions, or one or more regions 1622 may have width properties that differ from each other. Furthermore, one or more of regions 1622 may have non-uniform width 1626, for example as discussed above in reference to FIGS. 11 and 15.

When implemented in either one of non-coaxial lidar system 400 and scanning lidar system 500, each region 1622 of mask 1600 transmit light pulses backscattered from a corresponding distances range. Thus, mask 1600 may be implemented to survey a plurality of separate distance ranges while suppressing detection of light pulses from distances therebetween.

In one embodiment, the overall envelope 1630 of regions 1622 has shape similar to region 900, 1100 or 1500. In this embodiment, the regions 1622 may collectively be viewed as a single region 900/1100/1500 modified to suppress light pulses from one or more sub-ranges of distances. More generally, regions 1622 of mask 1600 may be viewed as a single region 122 interrupted by one of more opaque areas to suppress transmission of light pulses from one or more respective sub-ranges of distances.

Figure 17:
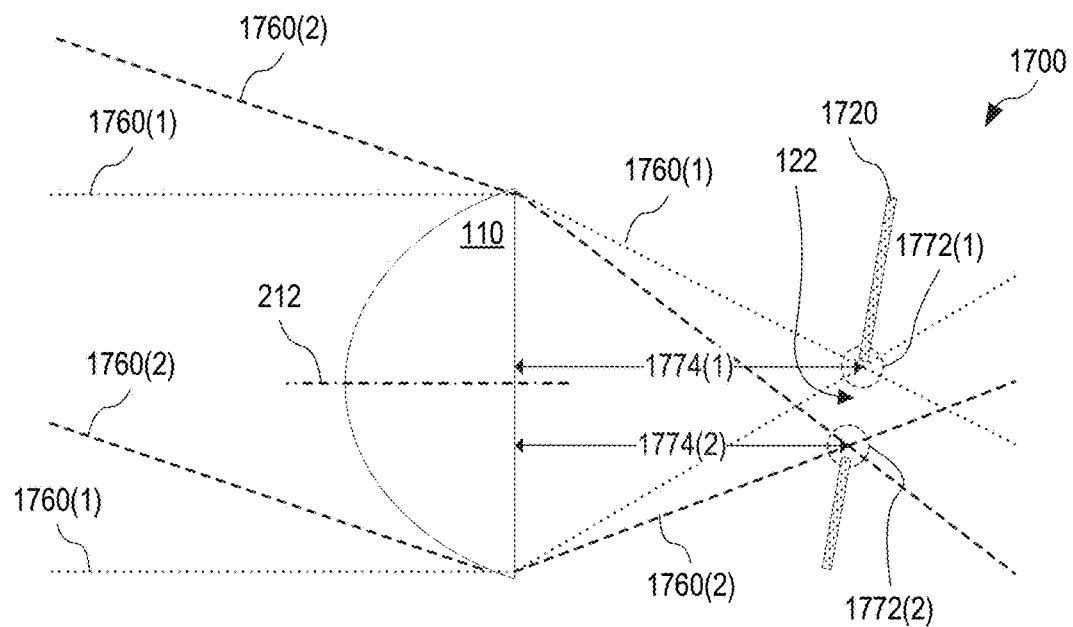
FIG. 17 illustrates a mask configuration pertaining to an embodiment of a receiver module.

FIG. 17 illustrates one mask configuration 1700 pertaining to an embodiment of receiver module 102. Mask configuration 1700 implements a planar mask 1720 positioned at an oblique angle to optical axis 212 of collection lens 110. Mask 1720 is an embodiment of mask 120. Configuration 1700 positions mask 1720 to approximate the profile of the image plane of collection lens 110 in either one of non-coaxial lidar system 400 and scanning lidar system 500 (as well as non-coaxial modifications of scanning lidar system 500, as discussed above in reference to FIGS. 4 and 5). As discussed above in reference to FIGS. 4 and 5 and illustrated here in FIG. 17, light 1760 incident on collection lens 110 at different incidence angles is focused at different respective points 1772 that are different respective distances 1774 (along optical axis 212) away from collection lens 110. The position of mask 1720 in configuration 1700 approximately matches the resulting image plane of collection lens 110.

Without departing from the scope hereof, configuration 1700 of receiver module 102 may further include a folding mirror (or other optic that redirects light) between collection lens 110 and mask 1720. In this embodiment, mask 1720 is at an oblique angle to a propagation direction of light 1760 that passed through collection lens 110 along optical axis 212.

Figure 18:
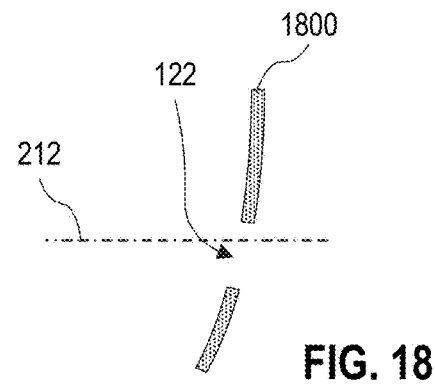
FIG. 18 illustrates a curved mask, according to an embodiment.

FIG. 18 illustrates one curved mask 1800. Mask 1800 is an embodiment of mask 120, curved to match a curved profile of the image plane of collection lens 110 in certain embodiments of non-coaxial lidar system 400 and scanning lidar system 500 (as well as non-coaxial modifications of scanning lidar system 500). Mask 1800 may replace mask 1720 in configuration 1700.

Figure 19:
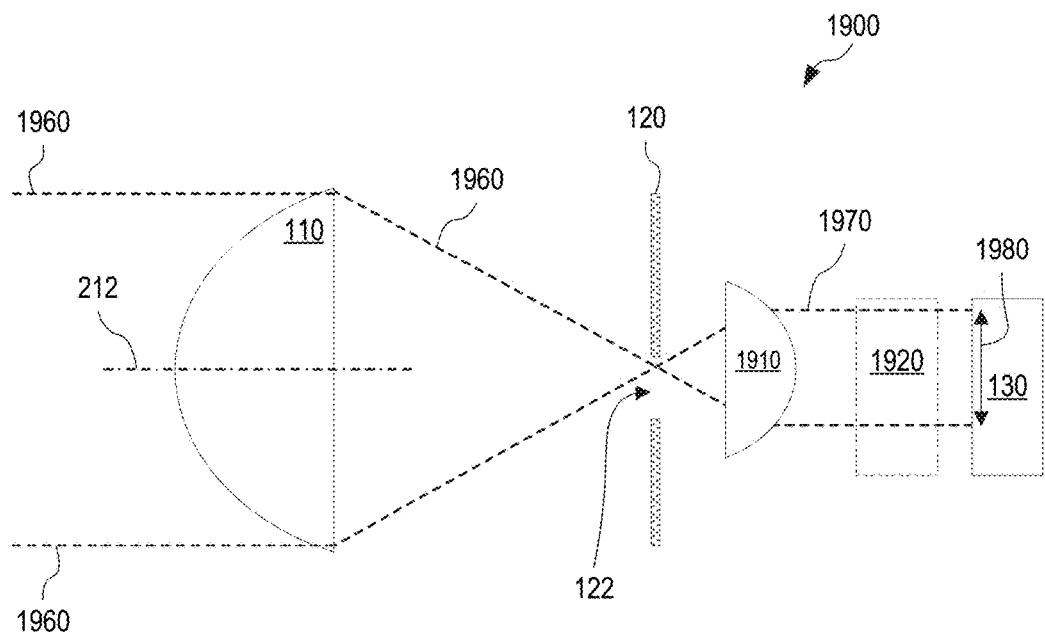
FIG. 19 illustrates a receiver module with approximately collimated detection, according to an embodiment.

FIG. 19 illustrates one receiver module 1900 with approximately collimated detection. Receiver module 1900 is an embodiment of receiver module 102 that includes a collimation lens 1910 between mask 120 and photodetector 130. Collimation lens 1910 approximately collimates light 1960 collected by collection lens 110 and transmitted by region 122 of mask 120, so as to form approximately collimated light 1970 propagating toward photodetector 130. Light 1970 spans a lateral range 1980 on photodetector 130 in the dimension parallel to the long dimension of region 122. The position of lateral range 1980 depends on the angle of incidence of light 1960 onto collection lens 110. In an embodiment, collimation lens 1910 has focal length such that lateral range 1980 is significantly greater than the variation in position and size of lateral range 1980 over the distance range surveyed by a lidar system implementing receiver module 1900, so as to minimize any impact on detection accuracy from spatial properties of light incident on photodetector 130.

It is understood that collimation lens 1910 may not provide exact collimation of all light incident on collection lens 110 and transmitted by region 122. In the example depicted in FIG. 19, collimation lens 1910 is configured to recollimate light that is incident on collection lens 110 as collimated light propagating parallel to optical axis 212. In this example, light backscattered toward collection lens 110 from a distant but off-axis object is substantially collimated but incident on collection lens 110 at a non-zero angle to optical axis 212, and will therefore propagate at an angle relative to optical axis 212 after collimation lens 1910. Also in this example, light backscattered toward collection lens 110 from a short distance will diverge somewhat after collimation lens 1910. In certain embodiments, light 1970 is collimated to within one milliradian.

Even though the collimation lens 1910 may not provide exact collimation, collimation lens 1910 reduces the angles of light propagation relative to optical axis 212. This reduction may be advantageous for optimal performance of photodetector 130 and allows for positioning of photodetector 130 further from mask 120 than in receiver modules without collimation. Collimation lens 1910 also provides a suitable area for positioning of one or more optical filters. In one embodiment, receiver module 1900 includes an interference filter 1920 positioned between collimation lens 1910 and photodetector 130. Interference filter 1920 may be configured to transmit only a certain spectral range, such as light of the same wavelength as light emitted by transmitter 150, so as to suppress detection of ambient light. It is worth noting that, although the passband of an interference filter shifts with incidence angle of the light onto the interference filter, this shift generally increases faster than linearly with the incidence angle. For example, light 1970 collimated to within 5 degrees may not be significantly affected by such a shift.

Figure 20:
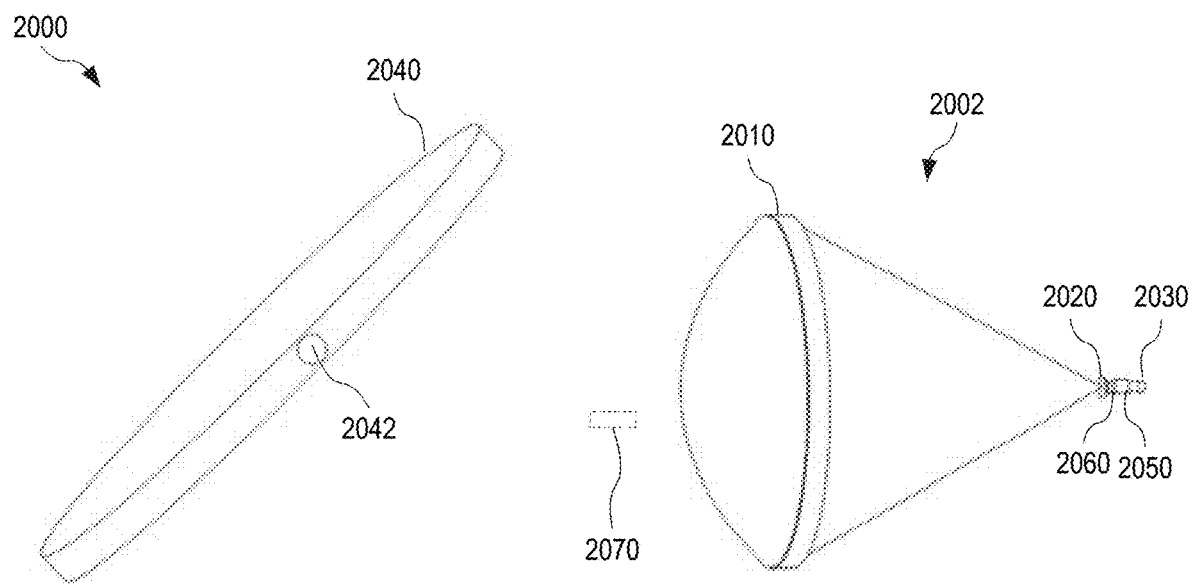
FIG. 20 illustrates a receiver module drawn to scale, according to an embodiment.

FIG. 20 illustrates one receiver module 2002 drawn to scale. Receiver module 2002 is an embodiment of receiver module 1900 and includes a collection lens 2010, a mask 2020, a collimation lens 2060, and interference filter 2050, and a photodetector 2030. The focal length of collection lens 2010 is approximately 50 millimeters and the active area of photodetector 2030 has transverse dimensions of at least 0.25 millimeters, such as in the range between 1 and 6 millimeters.

Receiver module 2002 may be implemented in a scanning lidar system 2000 that includes a scanning optic such as a rotating mirror 2040 configured to rotate about a rotation axis 2042. Scanning lidar system 2000 may further include a transmitter 2070 positioned between collection lens 2010 and the scanning optic, either off-axis as depicted in FIG. 20 or coaxially with collection lens 2010.

FIGS. 21A and 21B illustrate one lidar method 2100 with non-circular spatial filtering. Method 2100 may be performed by lidar system 100, non-coaxial lidar system 400, or scanning lidar system 500 (or a non-coaxial modification thereof, as discussed above in reference to FIGS. 4 and 5). Method 2100 includes steps 2110, 2130, 2140, and 2170. Steps 2130, 2140, and 2170 may be performed by receiver module 102.

Step 2110 emits pulsed light toward a scene. In one example of step 2110, transmitter 150 emits pulsed light toward a scene, as discussed above in reference to FIGS. 1, 4, and 5.

Step 2130 collects light from the scene, including a backscattered portion of a light pulse emitted in step 2110. Step 2130 forms an image of the light pulse. In one example of step 2130, collection lens 110 collects light pulse 184 (or light 260) and forms an image thereof, as discussed above in reference to FIGS. 1-3.

In step 2140, a mask spatially filters the light imaged in step 2130. The mask is opaque apart from at least one non-circular light-transmissive region. Each non-circular light-transmissive region has orthogonal length and width. The length exceeds the width and is configured to transmit light collected at a range of incidence angles in a first angular dimension. Step 2140 may include blocking ambient light collected in step 2130, and each non-circular light-transmissive region may be shaped to optimize a trade-off between (a) transmission of light pulses backscattered from the scene and (b) blocking ambient light. In step 2140, the length of the non-circular light-transmissive region(s) may be set to define the range of backscattering distances surveyed. In one example of step 2140, mask 120 spatially filters light pulse 184 (or light 270) collected and imaged by collection lens 110, as discussed above in reference to FIGS. 1-3. Mask 120 may include a plurality of light-transmissive regions, as discussed above in reference to FIG. 16.

Step 2170 detects the light pulse collected by the lens in step 2130 and transmitted by the mask in step 2140. In one example of step 2170, photodetector 130 detects light pulse 184 (or light 280), as discussed above in reference to FIGS. 1-3.

In one embodiment of method 2100, step 2110 includes a step 2112 and step 2130 includes a step 2132. Step 2112 emits the pulsed light along an emission propagation direction, and step 2132 collects the light pulse along a return direction that is non-coaxial with the emission propagation direction. The difference between the emission propagation direction and the return propagation direction imposes a position shift of the image by an amount that increases with the distance to the point of backscattering. The position shift is parallel to the length of each non-circular light-transmissive region. This embodiment of method 2100 may be performed by non-coaxial lidar system 400, as discussed above in reference to FIG. 4.

Another embodiment of method 2100 further includes a step 2120 that scans the viewing direction, from which light is collected in step 2130, across the scene in the first angular dimension. Step 2120 thereby imposes a position shift of the image by an amount that increases with distance to point of backscattering. The position shift is parallel to the length of each non-circular light-transmissive region. This embodiment of method 2100 may be performed by scanning lidar system 500. In one example of step 2120, scanning optic 540 scans the viewing direction of receiver module 102, as discussed above in reference to FIG. 5. In one implementation of this embodiment of method 2100, step 2110 includes a step 2114 and step 2140 includes a step 2142. Step 2114 emits the pulsed light as a series of laser pulses characterized by a period (wherein the period is the time span between the start of two successive pulses emitted in step 2110). Step 2142 blocks light pulses shifted by an amount that exceeds the position shift incurred during one period, so as to prevent aliasing. Steps 2114 and 2142 cooperate to prevent aliasing wherein a light pulse backscattered by a distant object is mistakenly identified as a more recently emitted light pulse backscattered by a nearer object. In one example of this implementation, the scan rate of scanning mirror and region 122 are cooperatively configured such that length 224 of region 122 is shorter than the position shift incurred during one period. Thus, a light pulse that returns to receiver module 102 more than one period after its emission is blocked by an opaque portion of mask 120.

Yet another embodiment of method 2100 includes steps 2112, 2132, and 2120. This embodiment of method 2100 may be performed by a non-coaxial modification of scanning lidar system 500, as discussed above in reference to FIGS. 4 and 5.

Method 2100 may further include a step 2150, optionally together with a step 2160. Step 2150 approximately collimates the light transmitted by the mask in step 2140. In one example of step 2150, collimation lens 1910 collimates light 1960 as discussed above in reference to FIG. 19. Step 2160 spectrally filters the light after collimation in step 2150. In one example of step 2160, interference filter 1920 spectrally filters light 1970 as discussed above in reference to FIG. 19.

In an embodiment, step 2130 includes a step 2134 of focusing the light onto an image plane, and step 2140 includes a step 2141 of spatially filtering the light at the image plane. In one example of this embodiment, mask 120 is positioned at the image plane of collection lens 110.

Step 2140 may include one or more of steps 2144, 2146, and 2148. Step 2144 transmits a portion of the image (formed in step 2130) associated with the pulse, wherein the portion of the image increases as a function of distance to the point of backscattering. In one example of step 2144, mask 120 implements region 1100 or another light-transmissive region that has a tapered width, as discussed above in reference to FIGS. 11 and 12.

Step 2146 fully or partly blocks light pulses backscattered from distances shorter than a non-zero minimum distance. In one example of step 2146, region 122 of mask 120 is positioned to reduce, minimize, or block transmission of light pulses backscattered from distances shorter than a non-zero minimum distance and/or longer than a finite maximum distance, as discussed above in reference to FIGS. 4 and 5.

Step 2148 filters the image in an image plane that is curved and/or at an oblique angle to a propagation direction of light that, in step 2130, passes through an associated collection lens along its optical axis. In one example of step 2148, mask 120 is placed at an oblique angle to optical axis 212 of collection lens 110, and the optical path between collection lens 110 and mask 120 is not folded, as discussed above in reference to FIG. 17. In another example of step 2148, mask 120 is placed at an oblique angle to a propagation direction of light that passed through collection lens 110 along optical axis 212, as also discussed above in reference to FIG. 17. In yet another example of step 2148, mask 1800 spatially filters the light, as discussed above in reference to FIG. 18.

Without departing from the scope hereof, method 2100 may omit step 2110.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A lidar system, comprising:
   a receiver module including: (i) a collection lens for collecting light from a scene to form an image of the light; (ii) a mask for spatially filtering the light imaged by the collection lens to at least partly transmit a light pulse backscattered from an object in the scene, the mask being opaque apart from at least one non-circular light-transmissive region, each non-circular light-transmissive region having orthogonal length and width, the length exceeding the width and being sufficient to transmit light incident on the collection lens at a range of incidence angles in a first angular dimension; and
   (iii) a photodetector for detecting the light pulse collected by the lens and transmitted by the mask; and
   a transmitter for generating and emitting pulsed light, including the light pulse, toward the scene along an emission propagation path that is non-coaxial with a return propagation path, to the receiver module, of the light pulse backscattered from the object, difference between the emission propagation path and the return propagation path imposing a position shift of image of the light pulse by an amount that decreases with distance between the receiver module and point of backscattering, the position shift being parallel to the length of each non-circular light-transmissive region.

2. The lidar system of claim 1, the mask being at an oblique angle to a direction corresponding to the light pulse incident on the mask after propagating through the collection lens along an optical axis of the collection lens.

3. The lidar system of claim 2, the mask being non-planar.

4. The lidar system of claim 1, the width of each non-circular light-transmissive region decreasing along the length.

5. The lidar system of claim 1, the at least one non-circular light-transmissive region including a plurality of non-circular light-transmissive regions having mutually coaxial lengths.

6. The lidar system of claim 1, further comprising a collimation lens for collimating the light collected by the collection lens and transmitted by the mask.

7. The lidar system of claim 6, further comprising an interference filter for spectrally filtering light collimated by the collimation lens.

8. The lidar system of claim 1, the photodetector being a silicon photomultiplier including an array of binary microcells each of which responds in full to a single photon.

9. The lidar system of claim 8, each transverse dimension of an active area of the silicon photomultiplier being at least 0.25 millimeter.

10. The lidar system of claim 1, the length of each non-circular light-transmissive region being less than 0.5 millimeters.

11. A scanning lidar system, comprising:
    a receiver module including (i) a collection lens for collecting light from a scene to form an image of the light; (ii) a mask for spatially filtering the light imaged by the collection lens to at least partly transmit a light pulse backscattered from an object in the scene, the mask being opaque apart from at least one non-circular light-transmissive region, each non-circular light-transmissive region having orthogonal length and width, the length exceeding the width and being sufficient to transmit light incident on the collection lens at a range of incidence angles in a first angular dimension; and
    (iii) a photodetector for detecting the light pulse collected by the collection lens and transmitted by the mask;
    a transmitter for generating and emitting, toward the scene, pulsed light including the light pulse; and
    a scanning optic for scanning viewing direction of the receiver module in the first angular dimension, said scanning imposing a first position shift of the image by an amount that increases with distance between the receiver module and point of backscattering, the first position shift being parallel to the length of each non-circular light-transmissive region.

12. The scanning lidar system of claim 11, the transmitter being configured to emit the pulsed light toward the scene along an emission propagation path that is coaxial with a return propagation path to the receiver module of the light pulse backscattered from the object.

13. The scanning lidar system of claim 11, the transmitter being configured to emit the pulsed light toward the scene along an emission propagation path that is non-coaxial with a return propagation path to the receiver module of the light pulse backscattered from the object, difference between the emission propagation path and the return propagation path imposing a second position shift of the image by an amount that increases with distance between the receiver module and the point of backscattering, the second position shift being parallel to the length of each non-circular light-transmissive region.

14. The scanning lidar system of claim 11, each non-circular light-transmissive region having a respective length, for each non-circular light transmissive region, two extreme ends of the respective length being positioned to transmit light pulses backscattered from a scene object at a closest distance and a farthest distance, respectively, from the receiver module during scanning of the scanning optic.

15. A lidar method, comprising:
  emitting pulsed light along an emission propagation path toward a scene;
  collecting light from the scene to form an image of the light, the light including a light pulse emitted in the step of emitting and backscattered from the scene along a return propagation path that is non-coaxial with the emission propagation path,
  spatially filtering the light, imaged in the step of collecting, with a mask that is opaque apart from at least one non-circular light-transmissive region, each non-circular light-transmissive region having orthogonal length and width, the length exceeding the width and being configured to transmit light collected at a range of incidence angles in a first angular dimension; and
  detecting the light pulse transmitted by the mask,
  difference between the emission propagation path and the return propagation path imposing a position shift of the image by an amount that decreases with distance to point of backscattering, the position shift being parallel to the length of each non-circular light-transmissive region.

16. A lidar method, comprising:
  emitting pulsed light toward a scene;
  collecting light from the scene to form an image of the light, the light including a light pulse emitted in the step of emitting and backscattered from the scene,
  spatially filtering the light, imaged in the step of collecting, with a mask that is opaque apart from at least one non-circular light-transmissive region, each non-circular light-transmissive region having orthogonal length and width, the length exceeding the width and being configured to transmit light collected at a range of incidence angles in a first angular dimension;
  detecting the light pulse transmitted by the mask; and
  scanning viewing direction, from which light is collected in the step of collecting, across the scene in the first angular dimension, said scanning imposing a position shift of the image by an amount that increases with distance to point of backscattering, the position shift being parallel to the length of each non-circular light-transmissive region.

17. The lidar method of claim 16, comprising:
  in the step of emitting, emitting the pulsed light as a series of pulses characterized by a period; and
  in the step of spatially filtering, using the mask to block light pulses shifted by an amount that exceeds the position shift incurred during one period.

18. The lidar method of claim 15, the step of spatially filtering comprising filtering the image in an image plane that is at an oblique angle to a propagation direction of light that, in the step of collecting, passes through an associated collection lens along an optical axis of the associated collection lens.

19. The lidar method of claim 15, the step of spatially filtering comprising blocking, with the mask, light pulses backscattered from distances that exceed a finite maximum distance.

20. The lidar method of claim 15, further comprising, prior to the step of detecting, collimating the light transmitted by the mask.

21. The lidar method of claim 20, further comprising, prior to the step of detecting, spectrally filtering the light as collimated in the step of collimating.

22. The lidar method of claim 15, the step of spatially filtering comprising blocking ambient light.

23. The lidar method of claim 15, the step of spatially filtering comprising reducing dynamic range of optical power detected in the step of detecting.

* * * * *